Figure 1:
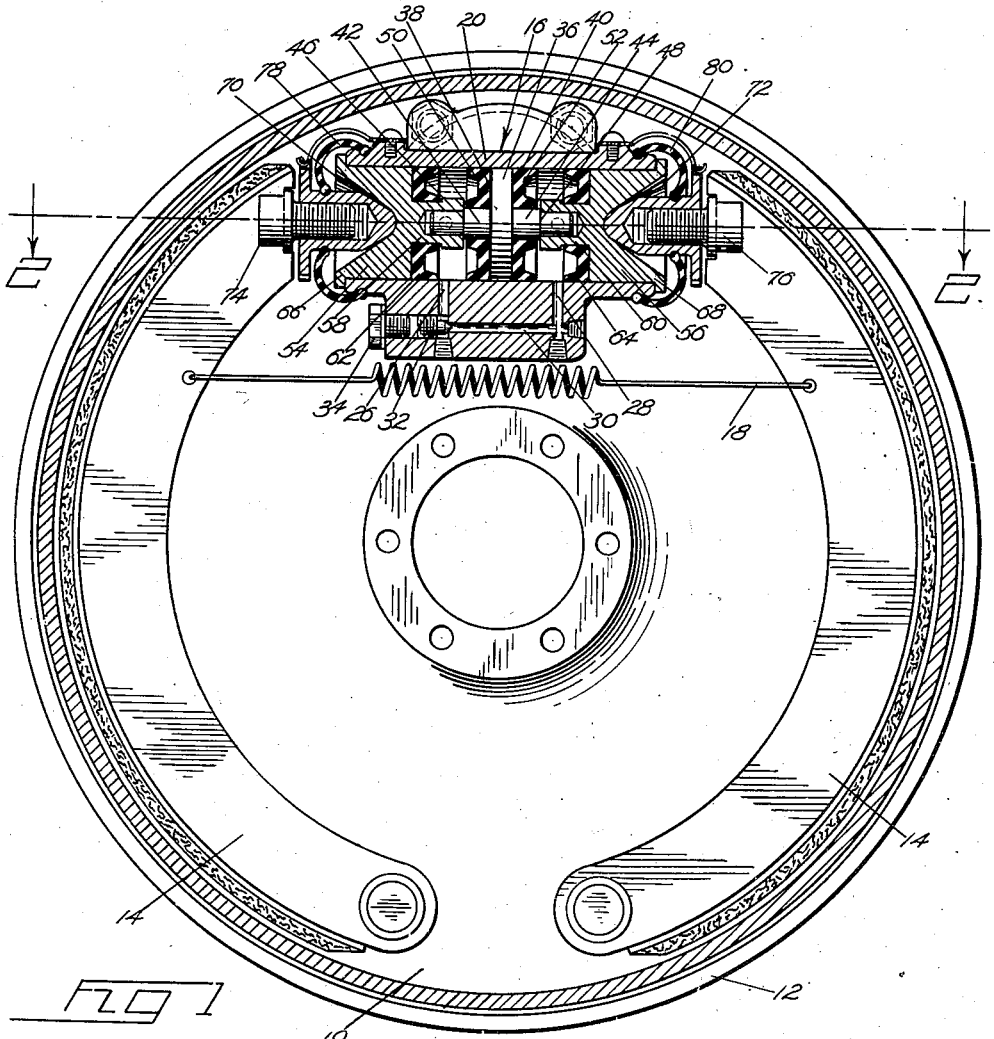

March 10, 1942. M. W. BOWEN 2,275,722
BRAKE
Original Filed Feb. 20, 1936

INVENTOR.
MYRON W. BOWEN
BY
ATTORNEY.

Patented Mar. 10, 1942

2,275,722

UNITED STATES PATENT OFFICE 2,275,722

BRAKE

Myron W. Bowen, Niles, Mich., assignor to Hydraulic Brake Company, Detroit, Mich., a corporation of California Original application February 10, 1936, Serial No. 64,929, now Patent No. 2,195,558, dated April 2, 1940. Divided and this application December 1, 1939, Serial No. 307,178

11 Claims. (Cl. 60—54.6)

This application is a division of my co-pending application, Serial No. 64,929, filed February 10, 1936 now Patent No. 2,195,558, and is made in accordance with requirements of the United States Patent Office under provision of Rule 42

This invention relates to vehicle brakes, and more specifically to fluid pressure actuated motors or wheel cylinders for activating the friction elements or shoes of a brake.

An object of this invention is the provision of a duplex fluid pressure actuated motor for activating the friction elements of a brake operative through a twinplex means, such as disclosed in my co-pending application hereinabove referred to, or by duplex fluid pressure braking systems operative concomitantly.

Another object of this invention is to provide separate means for energizing motors or wheel cylinders for actuating the friction elements of a brake operative independently or concomitantly.

A further object of this invention is to provide a duplex fluid pressure actuated motor operative to equalize the activative force or forces at the points of application.

Figure 2:
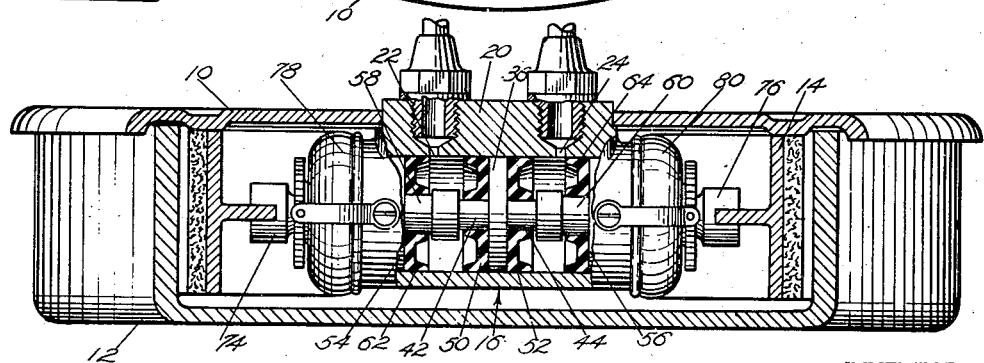

Other objects of the invention will appear from the following description taken in connection with the drawing which forms a part of this specification, and in which:

Fig. 1 is a vertical sectional view of a brake structure illustrating the fluid pressure actuated motor in section; and Fig. 2 is a sectional view substantially on line 2—2, Fig. 1.

Referring to the drawing for more specific details of the invention, 10 represents a fixed support or backing plate having associated therewith a rotatable drum 12. Corresponding shoes or friction elements 14 are pivotally mounted on the backing plate, and a fluid pressure actuated motor, indicated generally at 15, of the duplex type, also mounted on the backing plate, is operative to move the shoes into engagement with the drum 12 against the resistance of a retractile spring 18.

The duplex fluid pressure actuated motor 16 includes a cylinder 20 suitably secured to the backing plate 10 between the separable ends of the friction elements 14. The cylinder 20 has spaced inlet ports 22 and 24, and also spaced ports 26 and 28 connected by a passage 30 controlled as by a bleeder screw 32 concealed by a plug 34.

A floating piston 36 in the cylinder 20 between the spaced ports has oppositely disposed heads 38 and 40 provided with concentric double-diametral extensions 42 and 44, including opposed shoulders 46 and 48, and sealing cups 50 and 52 sleeved on the extensions are seated on the heads of the piston 36. Oppositely disposed pistons 54 and 56 reciprocable in the respective ends of the cylinder 20 have on their heads extensions 58 and 60 and sleeved on these extensions are sealing cups 62 and 64.

The extensions 58 and 60 on the pistons 54 and 56 are bored for the reception of the extensions 42 and 44 on the heads of the floating piston 36, and the free ends of the extensions 58 and 60 normally abut the shoulders 46 and 48 on the extensions 42 and 44 of the floating piston. The pistons 54 and 56 have flanges 66 and 68 adapted to engage the respective ends of the cylinders 20 so as to limit movement of the pistons in one direction. The pistons 54 and 56 also have recesses 70 and 72 in their backs for the reception of adjustable thrust pins 74 and 76 suitably connected to the friction elements 14, and shields 78 and 80 are connected between the thrust pins and the open ends of the cylinder for the exclusion of dust and other foreign substances.

In a normal braking operation, delivery of fluid under pressure from a suitable source into the chambers of the motor causes energization of the motor, causing actuation of the pistons 54 and 56. This actuation of the pistons 54 and 56 moves the shoes 14 into engagement with the drum 12 against the resistance of the retractile spring 18. Due to the floating piston 36 between the pistons 54 and 56, the pressures on the fluid in the chambers of the motor are equalized so that the shoes 14 may be applied with equal force.

During a braking application, should there occur a loss in the source of supply of fluid under pressure to either of the chambers of the motor, due to leakage or other causes, the floating piston shifts to abut and actuate the piston in the chamber, sustaining the loss of pressure on the fluid therein.

It is, of course, to be understood that fluid under pressure may be delivered in the respective chambers of the motor simultaneously or successively, as in instances where it is desirable to effect a light braking application followed by a heavy braking application, or that fluid under pressure may be delivered to one only of the chambers of the motor at a time for actuating the brakes as service and parking brakes.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A duplex fluid pressure actuated motor for activating oppositely positioned elements, said motor including a cylinder, opposed pistons in the cylinder, and a member floating within the cylinder between the pistons.

2. A duplex fluid pressure motor connected to oppositely arranged elements for the actuation thereof, said motor including a cylinder, opposed pistons in the cylinder, and a member floating within the cylinder between the pistons having parts telescoped by the pistons.

3. A duplex fluid pressure motor operatively connected to oppositely arranged elements for the activation thereof, said motor including a cylinder, opposed pistons in the cylinder, and a floating member in the cylinder having parts interconnected with the pistons.

4. A cylinder centrally of a pair of oppositely arranged elements having spaced ports, opposed pistons reciprocable in the cylinder, and a member reciprocable in the cylinders between the ports having parts slidably engaging and abutting the pistons.

5. A fluid actuated motor including a cylinder, opposed pistons reciprocable in the cylinder for activating oppositely arranged elements, and a piston floating within the cylinder between the opposed pistons to actuate the opposed pistons.

6. A cylinder fixedly supported between oppositely arranged elements having spaced ports, oppositely disposed pistons reciprocable in the cylinder, and a member reciprocable in the cylinder between the ports having parts slidably engaging and abutting the pistons.

7. A cylinder fixedly supported between oppositely arranged elements, opposed pistons connected to the elements reciprocable in the cylinder, a member floating within the cylinder between the opposed pistons, and means extending between said member and each of the pistons whereby either piston may be actuated by the member.

8. A cylinder fixedly supported between oppositely arranged elements, opposed pistons reciprocable in the cylinder for activating the elements, and a member interposed between the pistons movable relative to one of the pistons and movable relative to the cylinder to actuate one of the pistons.

9. A cylinder between oppositely arranged elements, opposed pistons in the cylinder connecting the elements, spaced ports in the cylinder, a member reciprocable in the cylinder intermediate the pistons normally spacing the pistons from one another and adapted to actuate either of the pistons.

10. A cylinder positioned between a pair of elements, spaced ports in the cylinder, opposed pistons reciprocable in the cylinder, a floating member intermediate the spaced ports providing chambers in conjunction with the pistons, said ports communicating directly with their respective chambers, and means in the chambers connecting the member and pistons for the respective actuation thereof.

11. A duplex fluid pressure actuated motor for actuating oppositely positioned elements, said motor including a cylinder, opposed pistons in the cylinder, said cylinder provided with spaced inlet ports, a member floating within the cylinder between the ports and engaging each of the opposed pistons to position the same, and movable within the cylinder with or relative to either piston.

MYRON W. BOWEN.